(12) United States Patent
Bremsteller

(10) Patent No.: US 6,985,621 B2
(45) Date of Patent: Jan. 10, 2006

(54) METHOD OF GENERATING PAINTED OR TILE MOSAIC REPRODUCTION OF A PHOTOGRAPH OR GRAPHIC IMAGE

(76) Inventor: Barry D. Bremsteller, 7053 Leopard Dr., Littleton, CO (US) 80124

( * ) Notice: Subject to any disclaimer, the term of this patent is extended or adjusted under 35 U.S.C. 154(b) by 837 days.

(21) Appl. No.: 09/866,413

(22) Filed: May 25, 2001

(65) Prior Publication Data

US 2002/0176620 A1 Nov. 28, 2002

(51) Int. Cl.
*G06K 9/00* (2006.01)

(52) U.S. Cl. ....................................................... 382/162
(58) Field of Classification Search ......... 382/162–167; 345/587–601; 434/81–90
See application file for complete search history.

(56) References Cited

U.S. PATENT DOCUMENTS

| | | | |
|---|---|---|---|
| 4,109,399 A | | 8/1978 | Ivancevich |
| 4,956,872 A | | 9/1990 | Kimura |
| 5,038,223 A | * | 8/1991 | Yamada ....................... 358/445 |
| 5,283,841 A | * | 2/1994 | Yamada ....................... 382/162 |
| 5,960,518 A | * | 10/1999 | Jeong ........................... 16/270 |
| 5,966,134 A | * | 10/1999 | Arias ........................... 345/589 |
| 6,067,073 A | * | 5/2000 | Rae-Smith et al. ......... 345/589 |
| 6,252,996 B1 | * | 6/2001 | Putnam ....................... 382/259 |
| 6,377,240 B1 | * | 4/2002 | Baudel et al. .............. 345/157 |
| 6,676,411 B2 | * | 1/2004 | Rehkemper et al. .......... 434/85 |

\* cited by examiner

*Primary Examiner*—Jingge Wu
(74) *Attorney, Agent, or Firm*—Ramon L. Pizarro; Edwin H. Crabtree

(57) ABSTRACT

A method for creating a hand colorable panel with a set of indicia for guiding the user in coloring to create the image. The method includes providing an image in digital form into a memory in a programmable computer, assigning pixel locations to the image, assigning color or shade palette values to the pixel locations, and printing, under the control of the programmable computer, indicia representing the color or shade palette values on a panel, so that a user colors over the indicia, using colors assigned to the indicia to create a hand-colored image on the panel.

12 Claims, 8 Drawing Sheets

| | | |
|---|---|---|
|  | 0 | 0 |
|  | 1 | 1 |
|  | 2 | 2 |
|  | 3 | 3 |
|  | 4 | 4 |
|  | 5 | 5 |
|  | 6 | 6 |
|  | 7 | 7 |
|  | 8 | 8 |
|  | 9 | 9 |
|  | 10 | A |
|  | 11 | B |
|  | 12 | C |
|  | 13 | D |
|  | 14 | E |
|  | 15 | F |
| 20 | 22 | 24 |

FIG. 7

Turn any Photo into a Painted Work of Art
with a
PhotoArt Kit

FIG. 8A

We take your
*Original Photograph*
(Print or electronic image file)
The image is transformed with
a patent pending process to generate a

*PhotoArt Kit*
The kit includes canvas,
artist quality paints,
brush, and instructions.

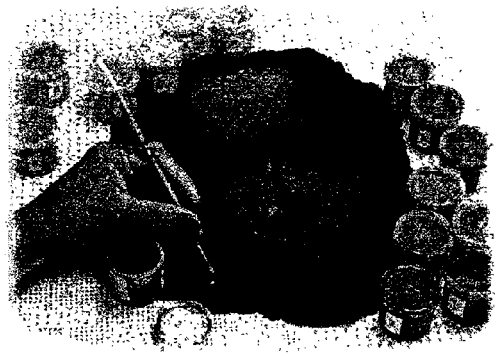

FIG. 8B

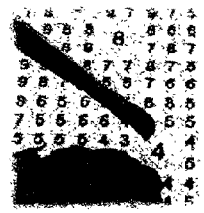

FIG. 8C

*Its easy!* All you do is match the symbol on the paint container with the symbol on the canvas, and dab that symbol with paint.

You can create your own
*Painted Work of Art*
Ready to mount, frame
and display.

PhotoArt Kit

No one will believe you painted it yourself!

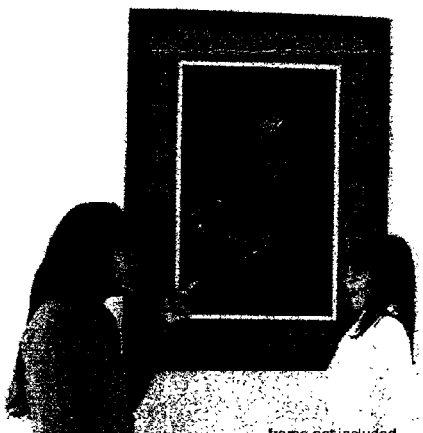

frame not included

PhotoArtUSA 7053 Leopard Drive Littleton CO 80124 (303) 768-8334 email: barrybrem@yahoo.com

METHOD OF GENERATING PAINTED OR TILE MOSAIC REPRODUCTION OF A PHOTOGRAPH OR GRAPHIC IMAGE

BACKGROUND OF THE INVENTION (a) Field of the Invention

The present invention relates to a paint-by-numbers type of kit, as well as to a method of generating an accurate and artistically pleasing mosaic reproduction of a photograph or graphic image.

(b) Discussion of Known Art

In the prior art, kits for creating art works using a paint by numbers approach are well known. Furthermore, methods have been developed in which a user follows some predetermined pattern in which to apply paints or some other media in order to create a work of art. Paint-by-numbers kits offer a novice user the capability of easily creating a painting by following a predetermined design of pattern and color.

A problem, however, with the approach taken by designers of traditional paint by numbers approaches is that they provide a boundary and a number within that boundary. This fixed boundary approach results in paintings that can be easily detected as being of the paint-by-numbers variety. The finished painting has an uninteresting, cartoon-like quality. Furthermore, the user may chose only from a pre-developed set of finished kits and the quality of the kits is determined completely by the creativity and skill of the kit manufacturer. The kits themselves are time-consuming to generate since there is no automated process to generate the patterned surface medium onto which the user will paint. Still further, the painting process associated with these known devices leaves little opportunity for the user add his or her own creative input, and result in nearly identical paintings regardless of the talents of the person carrying out the painting.

The paintings are typically of some generic scene that has been selected by the manufacturer, such as mountain panorama, ocean beach with breaking waves, or wildlife. Thus, there remains a method that allows the user to select and create an accurately reproduced painting that has the appearance of a freehand painting, starting directly from an image such as a photograph or graphic image.

Other methods have been developed in which a user can create an art work by using special ink or paint applicators to apply patterns of color media to selected areas of the surface medium. However, in these systems the surface medium again contains a pre-defined pattern or borders onto which the user applies the color media (U.S. Pat. Nos. 4,836,381 and 5,344,322).

Thus, there remains a need for a system and method that assists the user in producing a painting, such as an abstract painting of a completely creative or decorative nature and does not recreate in an accurate way an original image.

Accordingly, there remains a need for a paint by numbers kit which is an accurate and artistically pleasing painted reproduction of any photograph or graphic image.

There remains a need for a paint by numbers or guided system that can be generated by the user, starting with a simple, automated process.

There remains a need for a paint by numbers or guided system that can be used to create a painted artwork with photographic realism.

There remains a need for a paint by numbers or guided system that allows a user to generate a painted reproduction of a photograph or graphic image of any size and detail.

SUMMARY

It has been discovered that the needs left unanswered by known devices can be met with the use of a system that creates a guide or indexed layout of areas to paint from an existing image, whether the image is in digital form or in photographic or similar form. The system or method includes:

providing an image in digital form into a memory in a programmable computer;

assigning pixel locations to the image;

assigning color or shade palette values to the pixel locations; and printing, under the control of the programmable computer, indicia representing the color or shade palette values on a panel, so that a user paints over the indicia, using paints assigned to the indicia to create a hand-painted image on the panel.

It is important to note that the invention could be practiced by simply providing a panel, which may be a surface such as a wall, floor, or section of paper, canvas, cardboard, or other sheet material with indicia, such as numbers, without the use of borders. Preferably, the indicia would be of different font sizes, in some instances, positioned in varying densities over the panel to signal to the user that different textures or stroke characteristics should be employed to arrive at a finished product. Thus, from this perspective, the size and quantity of indicia may serve as a teaching or instructional tool to teach individuals how the use of different brush strokes can be used to achieve different visual characteristics in the finished painting.

Still further, it is important to note that the disclosed system may be used to create mosaic tile compositions. In these situations the user could once again be guided by the placement of indicia various sizes and densities, meaning number of occurrences of the same indicia over a given area, or heavy, bold type.

Thus, one example of the invention includes a method of painting a reproduction of an electronic image file, the method including the following steps:

a.) dividing the end surface medium into a rectilinear coordinate grid in which the color of each coordinate grid of the surface medium corresponds to the corresponding coordinate pixel of the electronic image file, b.) providing idicia on each coordinate of the surface medium which identifies the corresponding color in which to paint each coordinate pixel of the media, c.) assigning selectors that identify paints and which corresponds to the indicia, whereby the completed painting is an accurate and artistically pleasing reproduction of the electronic image file.

Another example of the invention includes a method for creating a mosaic panel reproduction of an electronic image file comprising the following steps:

a.) dividing the end panel into a rectilinear coordinate grid in which the color of each coordinate grid of the panel corresponds to the corresponding coordinate pixel of the electronic image file, b.) providing indicia on each coordinate of the panel which identifies the corresponding color of a rectangular shaped tile which is mounted to each coordinate grid location of the panel, c.) assigning a selector that identifies from a plurality of color tiles and which corresponds to the indicia, d.) mounting to each coordinate grid location of the panel the color tile, so that the completed painting is an accurate and artistically pleasing reproduction of the electronic image file.

Still another example includes a method of constructing an enlargement of an electronic image file which can be used as an architectural building facade comprising the following steps:

a.) dividing the end facade into a rectilinear coordinate grid in which the color of each coordinate grid of the facade corresponds to the corresponding coordinate pixel of the electronic image file, b.) enlarging the facade to any height by dividing the desired height of the facade by the number of pixel rows of the electronic image file in order to calculate the height and width of each and every square coordinate grid location of the facade, b.) providing means in which to transform each coordinate grid location of the facade into the color which corresponds to each coordinate pixel of the electronic image file, so that the completed facade is an accurate and artistically pleasing reproduction of the electronic image file and which can be constructed to any desired size.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 7 shows the painting of the image of the face of a monkey using the disclosed invention.

FIG. 8A shows a photograph to be converted into a painting.

FIG. 8B shows the manual painting of the canvas with numbers in place, and the use of number coded containers for guiding the user.

FIG. 8C is a close-up view of a paintbrush as it is about to be placed over a number created with the disclosed invention.

LIST OF REFERENCE NUMERALS

Figure 1:
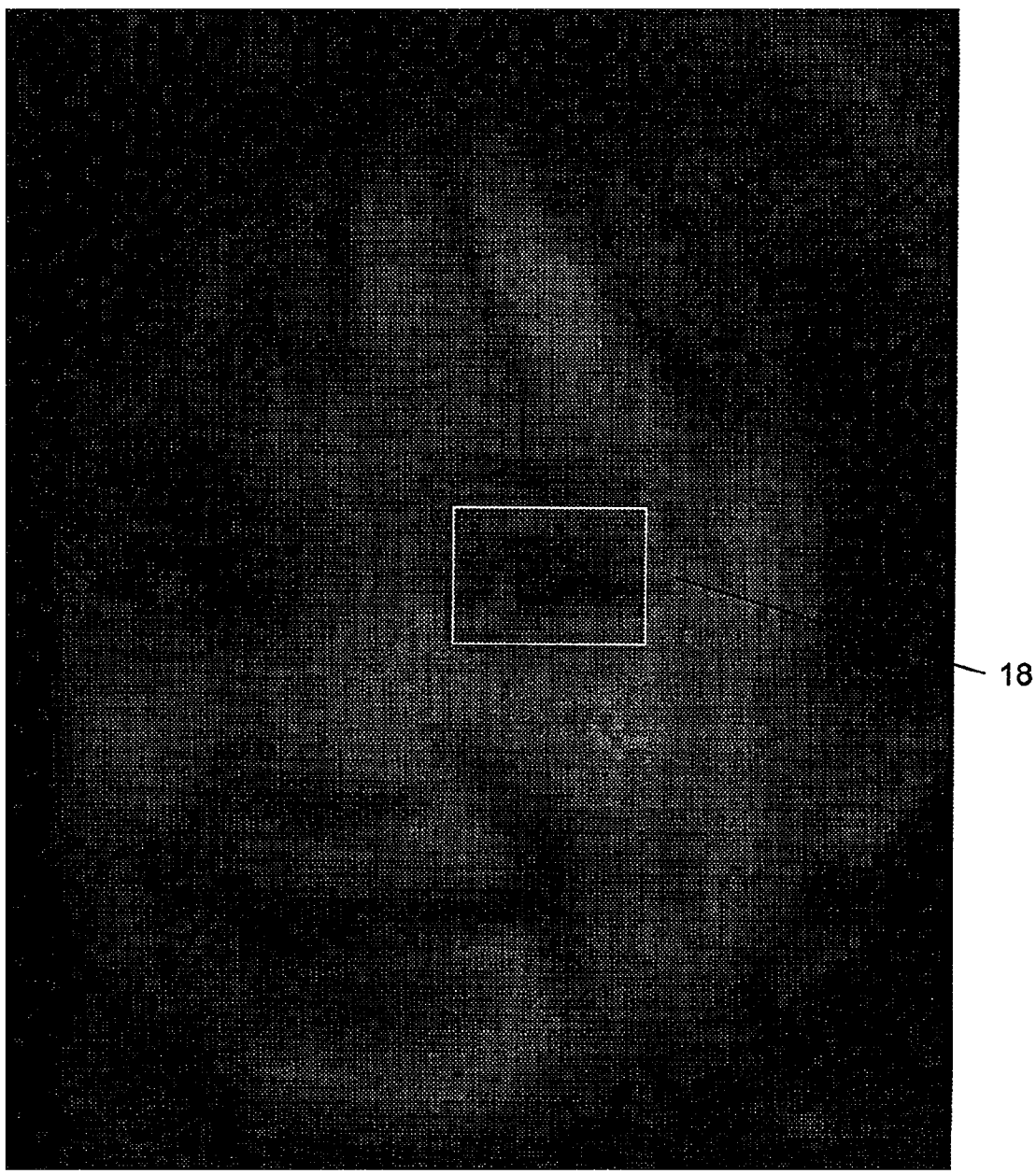
FIG. 1 shows a photograph of a young girl which has been scanned by a digital photographic scanner and stored as an electronic bit-mapped image file.

18 Enlargement of bit-mapped image of girl's eye
20 Palette color
22 Palette color entry
24 Palette color symbol
26 Pixel at x=0, y=0
28 Pixel at x=15, y=9
30 Palette color symbol at x=0, y=0
32 Palette color symbol at x=15, y=9
34 Coordinate grid area
36 Rigid backing
38 Printed grid
40 Selector symbol
42 Color paint
44 Paint brush applicator

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention A typical embodiment of the invention will be described. A photograph or graphic image is stored electronically as a bitmapped computer image file. If desired, the image may be manipulated electronically using a graphics editing software program. The image may be cropped in dimension, or brightness and or contrast altered for a particular desired effect. Any imperfection in the photograph may be corrected using the electronic editing capabilities of such software programs.

FIG. 1. shows a photograph of a young girl which has been scanned by a digital photographic scanner and stored in bitmapped computer image file format with a resolution of 80 pixels in the x direction and 100 pixels in the y direction. The file format is such that the x,y coordinate location of each pixel is represented by a numerical value which corresponds to a specific color value. This color value is also referenced as an entry into the color palette which is also stored within the bitmapped computer image file. The color palette may be an arbitrary size but is typically between 16 and 256 colors.

Although in the present description, the computer graphic image has a dimension of 80 pixels in the x direction and 100 pixels in the y direction, and a palette consisting of 16 shades of gray, the process is identical for a computer graphic of arbitrary dimension. Furthermore, the process is identical for a color or gray-scale palette with an arbitrary number or colors or shades of gray.

Figure 2:
FIG. 2 shows the 16 color palette of the electronic bit-mapped image of FIG. 1.
Figure 2:
Figure 2:
Figure 2:
Figure 2:
Figure 2:
Figure 2:
Figure 2:
Figure 2:
Figure 2:
Figure 2:
Figure 2:
Figure 2:
Figure 2:
Figure 2:
Figure 2:

A 16 color palette is represented in FIG. 2. The palette color 20 has a palette entry 22, and also an associated symbol assignment 24. The color of each pixel will be represented by one of a plurality of symbols 24, each symbol corresponding to a particular palette color 20. Identifying symbols 24 are assigned to each and every palette color 22.

Figure 3A:
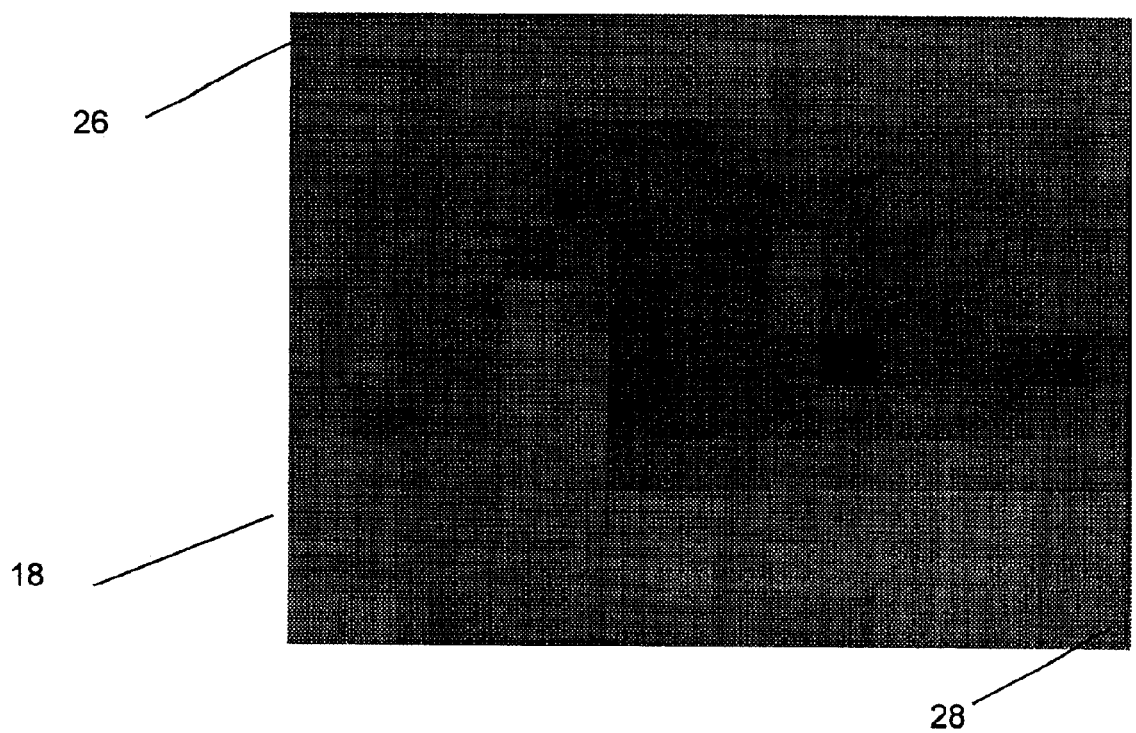
FIG. 3A shows an enlargement of the bit-mapped image of the girl's eye.

FIG. 3A shows an enlargement of the girl's eye 18. The enlarged area is 16 pixels in the x direction and 10 pixels in the y direction. The pixel 26 at location x=0, y=0 has a color corresponding to palette entry 4 and a corresponding symbol assignment 4. The pixel 28 at location x=0, y=15 has a color corresponding to palette entry 8 and a corresponding symbol assignment is assigned to the color symbol 32.

Figure 3B:
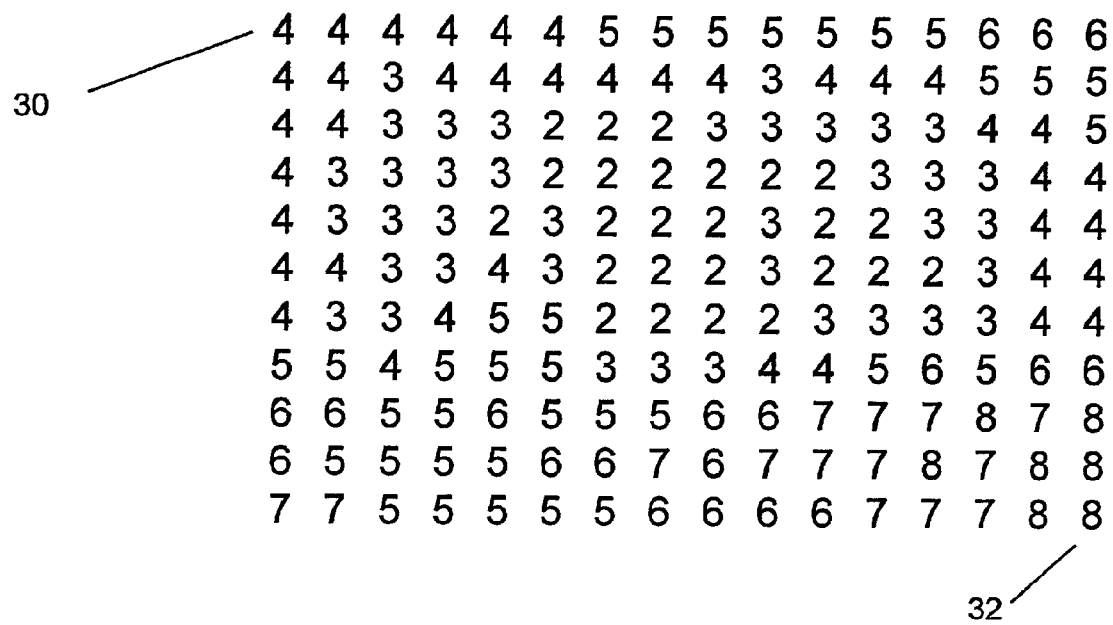
FIG. 3B shows a grid of symbols which correspond to the palette entries of each pixel of the enlarged bit-map of FIG. 2.

FIG. 3B shows a grid of symbols 24 corresponding to palette entry values 22. The grid is composed of 10 rows and 16 columns. Each row and column location of the grid corresponds to the x,y pixel location of FIG. 3A. The symbol 24 at each location of the grid in FIG. 3B corresponds to a palette entry value 22 of each pixel of FIG. 3A. The palette color symbol 30 at row=0, column=0 has a color corresponding to palette entry 4 and a corresponding symbol assignment 4. The palette color symbol 32 at row=9, column=15 has a color corresponding to palette entry 8 and a corresponding symbol assignment.

Figure 4A:
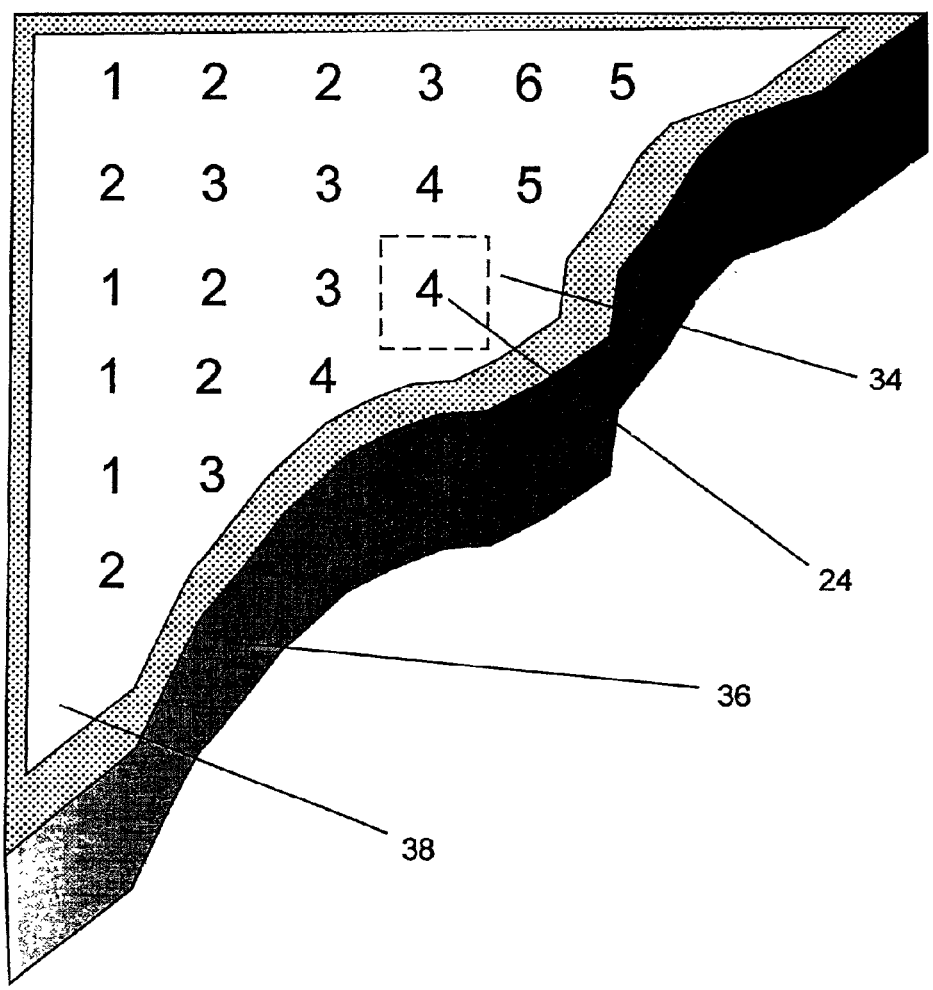
FIG. 4A shows a printed grid of symbols mounted on a rigid backing.

Using this same method, a grid of symbols is generated of the entire photograph in FIG. 1. Referring to FIG. 4A, the grid 38 is printed onto art paper or any other media suitable for painting. The printed grid 38 may then be mounted with adhesive onto a rigid support backing 36 such as a solid foam core or thick cardboard. The printed grid 38 may also be generated onto a canvas and mounted onto a wooden frame or any other means suitable for mounting art canvas. The grid may also be supplied not mounted as the user may wish to use the finished painting in his own customized way.

Figure 4B:
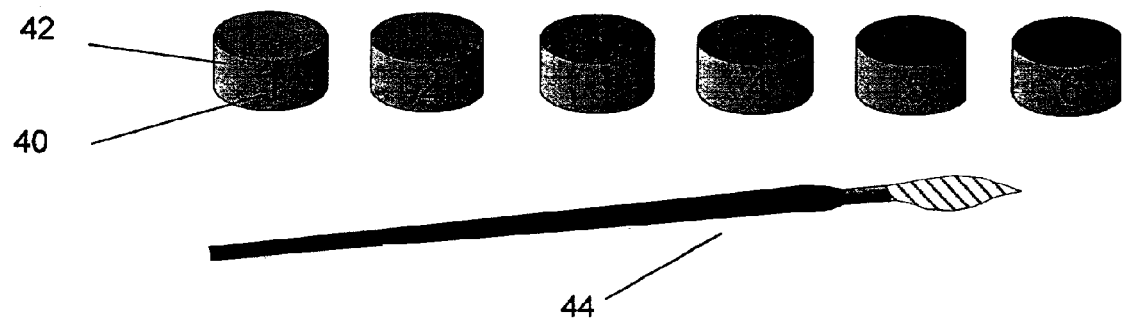
FIG. 4B shows paints labeled with selector symbols and a paint brush applicator.

Referring to FIG. 4B, A plurality of different paints 42 which correspond to the palette colors 20 of FIG. 2 are supplied. Each different paint 42 is separately identifiable by its own selector symbol 40. Each selector symbol 40 corresponds to the palette entry value 22 and is identical to the palette symbol 24 in FIG. 2. The user then paints the unpainted grid 38 using the particular paint 42 in which the selector symbol 40 matches the palette symbol 24. A paint brush 44 or any other applicator suitable for applying paint is supplied for the user to apply the paint to the grid. It is important to note that it is contemplated that the color may be applied a part of sections of ceramic tile or other colored materials.

The rectangular border 34 of each individual coordinate grid location may be printed onto the grid as it serves mainly to define the approximate area of each coordinate location. Furthermore, a preferred embodiment of the invention does not use a grid or border at all. Thus, in practice, the user need not paint the coordinate area 34 as an exact square. In fact, it has been discovered that a more pleasing painting is made as the user provides random variations from the imperfect filling in of each unpainted grid location with is corresponding color paint 42.

Referring to FIG. 8, it will be understood that it is contemplated that the color information may be placed on the surface to be painted or color simply as a palette color symbol 24. Additionally, the palette color symbol 24 may be adjusted in size to provide the user with information on brush stroke style or color intensity. Thus, the computer or program will designate a very large color symbol 24L to adjacent areas of similar color, which is to be de-emphasized. The larger color symbol 24L will be positioned at a large distance from the next color symbol. Areas that should draw the viewer's attention, and exhibit a large amount of detail, will be assigned a small color symbol 24S. The small color symbol will indicate to the user that shorter paint or color strokes or smaller pieces of tile should be used in these areas. The smaller strokes or pieces will provide a greater amount of detail, which will draw the viewer's attention.

Figure 5:
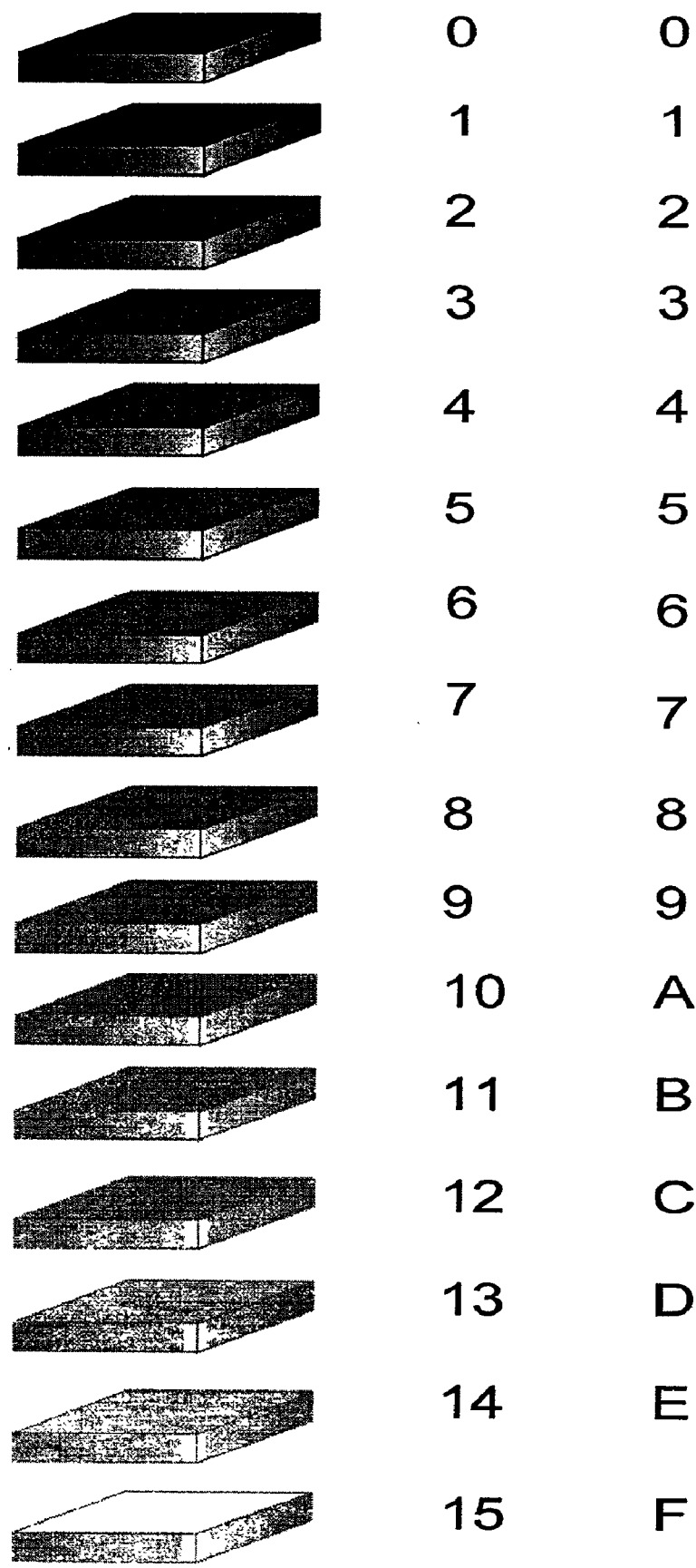
FIG. 5 shows 16 color tiles corresponding to the color palette.

Another embodiment of the present invention is accomplished using color mosaic tiles. In this case, rectangular tiles or tile pieces are supplied that are colored according to the color palette in FIG. 2. Referring FIG. 5, the colored tile 46 has a palette entry 22, and also an associated symbol assignment 24. The color of each pixel of the original image will be represented by one of plurality of symbols 24, each symbol corresponding to a palette color 20 of FIG. 2. Note that the palette color 20 of FIG. 2 is identical to the color of the tile 46 of FIG. 5.

Figure 6:
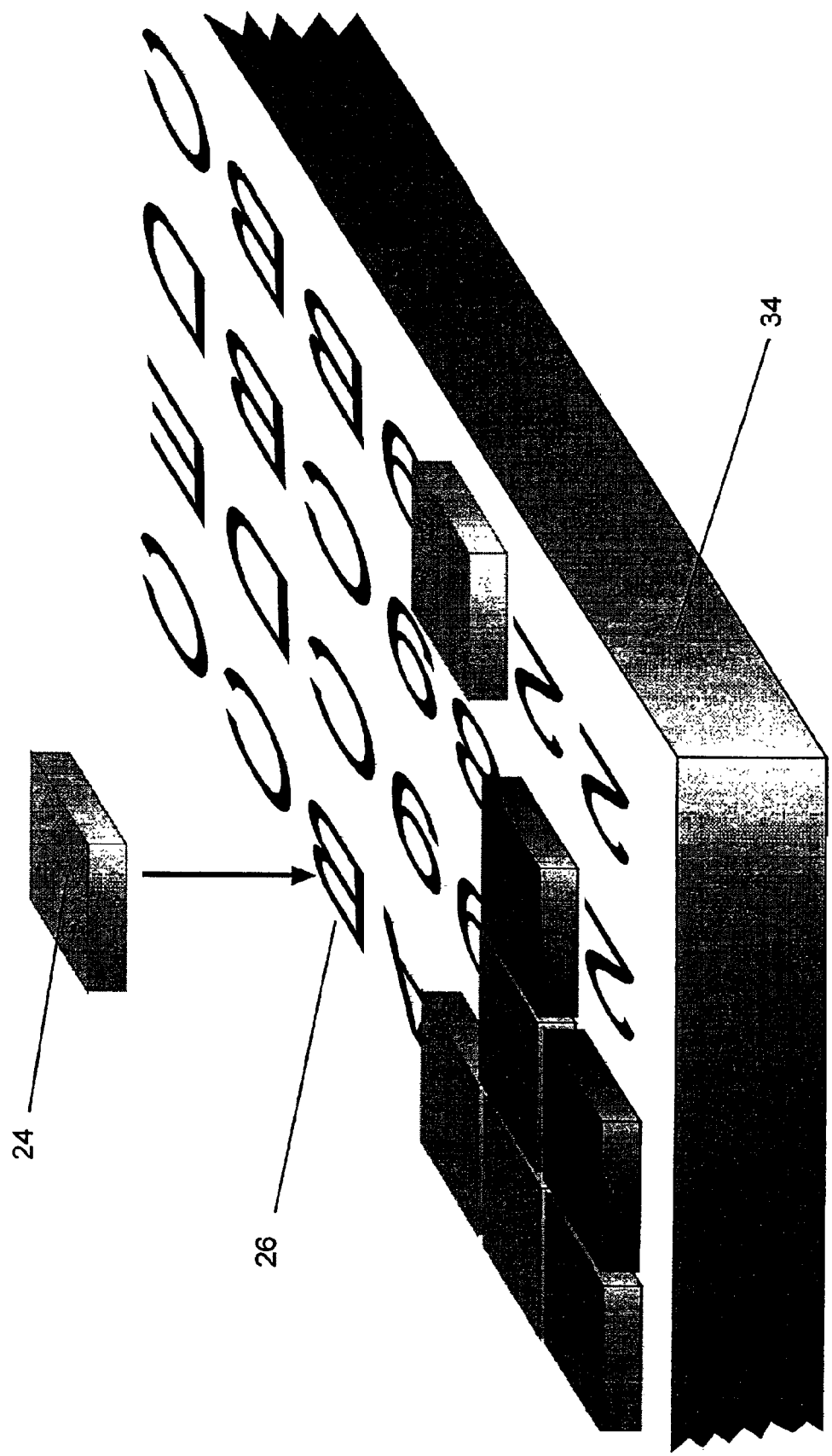
FIG. 6 shows a grid of colored mosaic tiles used with the disclosed invention.

Now referring to FIG. 6, it will be understood that the user attaches the colored tile 46 to the grid 26 according to associated symbol 26. Printed on the back side of the tile 24 is a selector symbol 46 which is identical to the grid symbol 26.

The tiles may be made of any of a number of materials such as plastic, ceramic, wood, cardboard, paper, stones, or natural materials such as sand, or other coloring or distinguishing materials. The tiles are manufactured such that their color matches the corresponding palette color in FIG. 2. Or the tiles may be manufactured with a neutral color and then later painted to the palette color 20. The tiles have a dimension such that they fit within the coordinate grid area 34, without necessarily taking up the entire grid area 34. The tiles may be attached to the grid by any suitable attachment, depending on the composition of the tile and grid surface. For example, the tiles may be set in place with a liquid adhesive applied to the grid material, or using a peel-off tape adhesive which has been placed on the underside of the tile surface 24.

The grid 34 is printed onto any suitable rigid supporting surface such as wood or press-board. The grid 34 may also be printed onto paper or plastic film and attached to the rigid supporting surface using any suitable means such as liquid adhesive or heat activated dry-mount.

The user proceeds to attach the tiles to the grid 34. When the user has completed attaching all of the tiles 46 to the grid 26, a mosaic tile artwork is generated which is an accurate reproduction or representation of the original bit-mapped computer image.

Another example of the invention uses the above described method to generate an accurate reproduction of a bit-mapped computer image of enormous size. This embodiment of the present invention could be used to construct a decorative building façade. The façade might be constructed in a hotel lobby, shopping mall, or any public building.

The height of the completed façde is calculated by multiplying the number of pixels in the y direction of the bit-mapped computer image by the height the coordinate grid area 24. The length of the completed façade is calculated by multiplying the number of pixels in the x direction of the bit-mapped computer image by the width the coordinate grid area 24. For example, a bit mapped computer image to be reproduced has a dimension of 200 pixels in the y direction and 400 pixels in the x direction, and the coordinate grid area 24 is 3 inches by 3 inches, the size of the completed façade can be computed as follows:

Height=200×0.25 feet=50 feet

Length=400×0.25 feet=100 feet

Thus a façade can be constructed of any height and length by either using a bit-mapped computer image of higher resolution which provides more pixels in the x and y directions, or by enlarging the coordinate grid area 24. In fact, the façade can be made to fit exactly into any dimension required by manipulation of the above formula.

The façade could be constructed using either of the two techniques described earlier. Using the technique described in the first embodiment, a rectilinear grid of symbols is generated which corresponds to the bit-mapped computer image. Paints would be mixed to match the palette color 20, such as those of FIG. 2. The paint would then be labeled with a selector symbol 40 to match the grid symbol 24.

Figure 7:
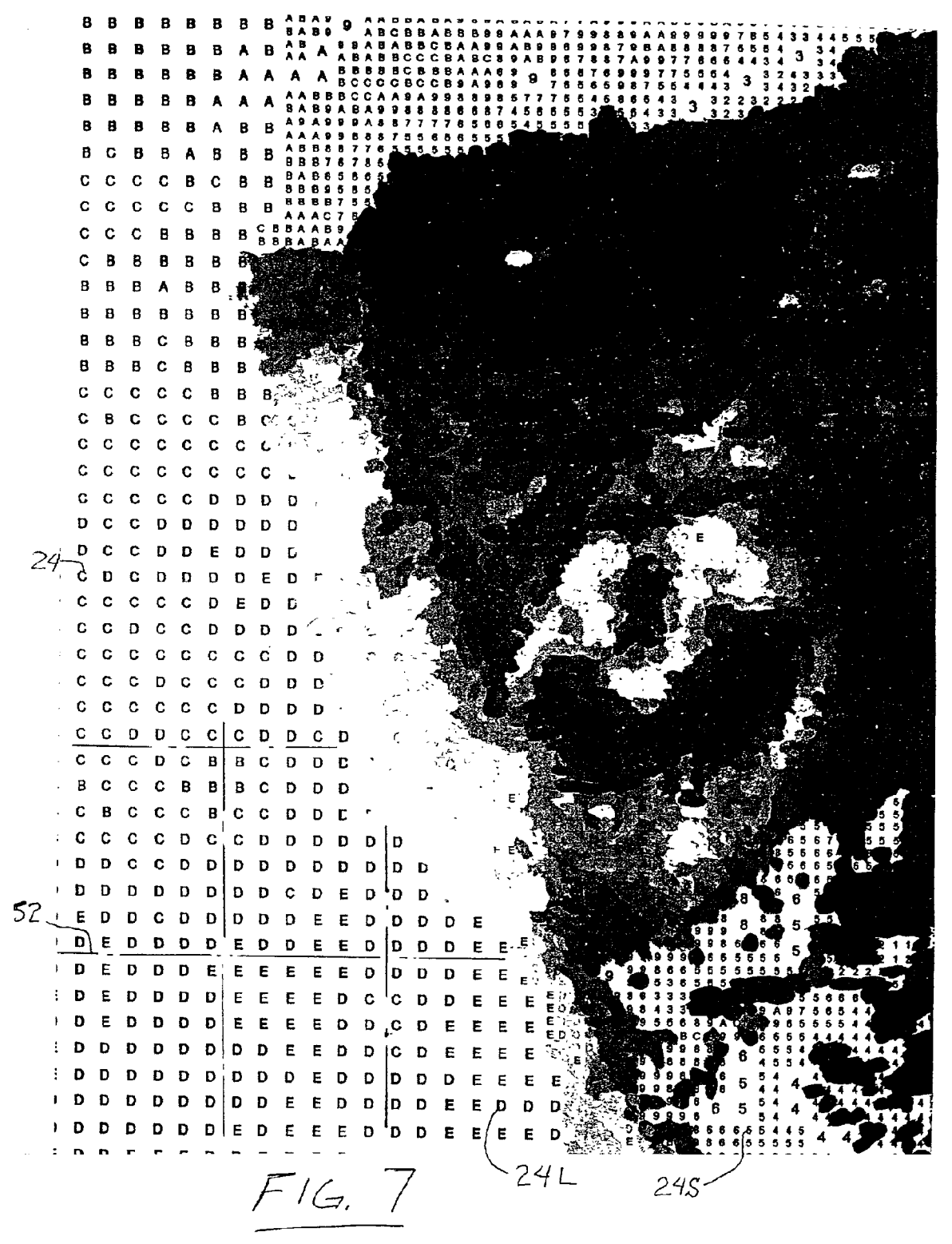

The particular format of the grid map could be altered to suit the practical consideration of the construction method. For example, the entire grid 50 might be divided into sub-grids of rectangular dimension to facilitate efficient painting of the entire grid. Referring to FIG. 7, the grid 50 could be divided into sub-grids 52 to be painted in individual sections by a number of painters working at the same time.

The wall to be painted would be divided into sections 54 corresponding to the sub-grids 52. Then, the grid symbols could be penciled onto the wall and painted in sections. The painter would then paint each grid location 24 according to the grid map generated from the bit-mapped computer image.

It may be more practical to divide the entire grid into sub-sections with dimensions suitable to paint pre-fabricated panels at an offsite location and then construct the completed panels at the building site using a map of the completed sub-grid panels. The method of the present invention is adaptable to optimizing the generation of the grid dimensions to whatever is suitable to the particular construction method being used.

A variation of the above embodiment would use tiles in place of painted coordinate areas. Here, the formula for calculating the height and length of the completed façade is identical to the formula described above for the painted grid.

Again, it may be more practical to divide the entire grid into sub-sections with dimensions suitable to construct pre-fabricated panels of mosaic tiles at an offsite location and then construct the completed panels at the building site using a map of the completed sub-grid panels.

Accordingly, the reader will see that the method of this invention can be used to reproduce a computer graphic image file in a variety of desirable embodiments. Since the finished painting or tile mosaic is generated using a method that ensures that the finished painting or mosaic corresponds in color and dimension to the original image, an accurate reproduction of the original image is ensured.

In addition, the method is suitable for computer manipulation. Using existing computer programs, the images can be manipulated to generate finished reproductions of any size. Automated techniques could be used to mass-produce art kits, or to custom produce art kits of any digitally scanned computer image file. Automated techniques can be used to efficiently manufacture decorative facades to use in architecture.

As various possible embodiments might be made of the above invention, these should not be construed as limiting the scope of the invention but as merely providing illustration of some of the preferred embodiments of this invention. For example, the bit-mapped computer image file can be of any dimension. The reproduced image may be stretched in either height or width to fit a predetermined dimension. The color palette of the bit-mapped computer image can be of any number of colors or shades of gray. The grid can be printed onto any number of materials such as paper, canvas, mylar, etc. Colored ink, pencils, crayons, hand held ink or paint applicators, etc. can be used as the color media applied to the grid. The mosaic tiles can have other shapes such as circular, trapezoidal, triangular, etc.

Thus the scope of the invention should be determined by the appended claims and their legal equivalents, rather than by the examples above.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A method for creating a hand paintable panel without the use of printed boundaries on the panel, but with a set of indicia for guiding a user in painting over the panel to create a painted image, the method comprising:
   providing an image in digital form into a memory in a programmable computer;
   assigning pixel locations to the image;
   assigning color or shade palette values to the pixel locations; and
   printing, under the control of the programmable computer, indicia representing the color or shade palette values on a panel, the indicia being printed without a boundary to represent a color or shade to be painted, so that a user paints over the indicia, using paints assigned to the indicia to create a hand-painted image on the panel.

2. A method according to claim 1 and further comprising the step of determining the presence of a group of pixels with similar adjacent color or shade values, defining a region generally coincident to the contiguous group of pixels with similar adjacent color or shade values and printing a single indicia at a single location within the region generally coincident to the contiguous group of pixels with similar adjacent color or shade values.

3. A method according to claim 1 and further comprising comparing color or shade palette values associated with the pixel locations, determining a number of contiguous pixel locations with similar color or shade palette values comparing the values, establishing a criteria for assigning a single character of indicia for the area of contiguous pixel location depending on the variation of color or shade palette values between adjacent pixels.

4. A method according to claim 1 and further comprising assigning font size to the color or shade palette in the font size corresponding to a brush size.

5. A method for creating a borderless hand paintable panel with a set of indicia for guiding a user in painting over the panel to create a painted image, the method comprising:
   proving a photographic image;
   creating an image in digital form from the photographic image and storing the digital form of the image in a memory in a programmable computer;
   assigning pixel locations to the image with the use of the programmable computer;
   using the programmable computer to assign color or shade palette values to the pixel locations; and
   printing, under the control of the programmable computer, indicia representing the color or shade palette values on the hand paintable panel, the indicia being printed without a printed boundary that represents the boundary of the color or shade palette values, so that a user paints over the indicia without the restriction of printed boundaries, using paints assigned to the indicia to create a hand-painted image on the panel.

6. A method according to claim 5 and further comprising the step of determining the presence of a group of pixels with similar adjacent color or shade values, defining a region generally coincident to the contiguous group of pixels with similar adjacent color or shade values and printing a single indicia without the use of printed boundaries at a single location within the region generally coincident to the contiguous group of pixels with similar adjacent color or shade values.

7. A method according to claim 5 and further comprising comparing color or shade palette values associated with the pixel locations, determining a number of contiguous pixel locations with similar color or shade palette values comparing the values, establishing a criteria for assigning a single character of indicia for the area of contiguous pixel location depending on the variation of color or shade palette values between adjacent pixels.

8. A method according to claim 5 and further comprising assigning font size to the color or shade palette in the font size corresponding to a brush size.

9. A method for creating a borderless guide for creating images defined by hand placed colorants, the method comprising:

providing a digital description of an image;

assigning pixel locations to the image;

assigning color or shade palette values to the pixel locations;

selecting contiguous pixel locations of similar color or shade palette values and assigning a single palette value to an area covered by the contiguous pixel locations, the palette value providing color or shade information as well as brush, information; and printing indicia representing the color or shade palette values on a surface, the indicia being printed without a printed boundry that represents the boundary of the color or shade palette values, so that a user placing colorants over the indicia by hand creates an image that re paints over the indicia, using paints assigned to the indicia to create a hand-painted image on the panel.

10. A method according to claim 9 and further comprising the step of determining the presence of a group of pixels with similar adjacent color or shade values, defining a region generally coincident to the contiguous group of pixels with similar adjacent color or shade values and printing a single indicia at a single location within the region generally coincident to the contiguous group of pixels with similar adjacent color or shade values.

11. A method according to claim 9 and further comprising comparing color or shade palette values associated with the pixel locations, determining a number of contiguous pixel locations with similar color or shade palette values comparing the values, establishing a criteria for assigning a single character, of indicia for the area of contiguous pixel location depending on the variation of color or shade palette values between adjacent pixels.

12. A method according to claim 9 and further comprising assigning font size to the color or shade palette in the font size corresponding to a colorant size proportion.

* * * * *